(12) United States Patent
Scott

(10) Patent No.: US 12,179,917 B1
(45) Date of Patent: *Dec. 31, 2024

(54) SELF-CHARGING UNMANNED VEHICLE

(71) Applicant: UNITED SERVICES AUTOMOBILE ASSOCIATION (USAA), San Antonio, TX (US)

(72) Inventor: Kade Scott, The Colony, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,641

(22) Filed: Oct. 20, 2021

Related U.S. Application Data

(63) Continuation of application No. 16/390,747, filed on Apr. 22, 2019, now Pat. No. 11,174,023, which is a continuation of application No. 15/425,456, filed on Feb. 6, 2017, now Pat. No. 10,301,022.

(60) Provisional application No. 62/293,400, filed on Feb. 10, 2016.

(51) Int. Cl.
| | |
|---|---|
| *B63B 35/00* | (2020.01) |
| *B64C 39/02* | (2023.01) |
| *G01C 21/00* | (2006.01) |
| *B60L 8/00* | (2006.01) |
| *B64D 27/353* | (2024.01) |
| *B64U 50/19* | (2023.01) |
| *B64U 50/34* | (2023.01) |

(52) U.S. Cl.
CPC ............ *B64C 39/024* (2013.01); *G01C 21/00* (2013.01); *B60L 8/003* (2013.01); *B60L 2200/10* (2013.01); *B60L 2200/32* (2013.01); *B63B 2035/006* (2013.01); *B63B 2035/007* (2013.01); *B64D 27/353* (2024.01); *B64U 50/19* (2023.01); *B64U 50/34* (2023.01)

(58) Field of Classification Search
CPC ....... B64C 39/024; G01C 21/00; B60L 8/003; B60L 2200/10; B60L 2200/32; B63B 2035/006; B63B 2035/007; B64D 2211/00; B64D 27/353; B64U 50/19; B64U 50/34

See application file for complete search history.

(56) References Cited

U.S. PATENT DOCUMENTS

| | | | | |
|---|---|---|---|---|
| 7,860,680 | B2 * | 12/2010 | Arms | H02J 7/00034 702/127 |
| 9,434,267 | B2 * | 9/2016 | Wang | B60L 53/80 |
| 9,511,878 | B1 * | 12/2016 | McDermott | G08B 21/185 |
| 9,671,791 | B1 | 6/2017 | Paczan | |
| 10,000,284 | B1 * | 6/2018 | Purwin | B64B 1/40 |
| 10,007,890 | B1 * | 6/2018 | Purwin | G08G 5/0069 |
| 10,078,808 | B1 * | 9/2018 | Sibon | G05D 1/0676 |
| 2010/0108807 | A1 * | 5/2010 | Barrett | B64C 39/024 244/17.11 |
| 2010/0268409 | A1 * | 10/2010 | Vian | G05D 1/104 701/25 |

(Continued)

FOREIGN PATENT DOCUMENTS

CN 107368090 A 11/2017

*Primary Examiner* — Harry Y Oh
(74) *Attorney, Agent, or Firm* — BakerHostetler

(57) ABSTRACT

Unmanned vehicles can be terrestrial, aerial, nautical, or multi-mode. Unmanned vehicles may efficiently accomplish tasks by autonomously charging or replacing its power source.

19 Claims, 4 Drawing Sheets

(56) References Cited

U.S. PATENT DOCUMENTS

| | | | |
|---|---|---|---|
| 2014/0032034 A1* | 1/2014 | Raptopoulos | H04B 7/18506 |
| | | | 701/25 |
| 2014/0222248 A1* | 8/2014 | Levien | G08G 5/0069 |
| | | | 701/2 |
| 2014/0233099 A1* | 8/2014 | Stark | G09F 27/00 |
| | | | 362/555 |
| 2014/0319272 A1* | 10/2014 | Casado | B64C 39/024 |
| | | | 244/110 E |
| 2015/0120094 A1* | 4/2015 | Kimchi | G06Q 10/083 |
| | | | 701/3 |
| 2015/0158392 A1* | 6/2015 | Zhao | B60L 53/80 |
| | | | 320/109 |
| 2015/0353206 A1* | 12/2015 | Wang | B60L 53/65 |
| | | | 244/114 R |
| 2016/0039300 A1* | 2/2016 | Wang | B64C 39/024 |
| | | | 244/58 |
| 2016/0039540 A1* | 2/2016 | Wang | B64C 39/02 |
| | | | 244/114 R |
| 2016/0107750 A1* | 4/2016 | Yates | B64U 80/80 |
| | | | 244/2 |
| 2016/0144959 A1* | 5/2016 | Meffert | B64U 10/13 |
| | | | 701/3 |
| 2016/0207637 A1* | 7/2016 | Campillo | B64F 1/10 |
| 2016/0236790 A1* | 8/2016 | Knapp | G01C 21/20 |
| 2016/0250933 A1* | 9/2016 | Kim | B60L 53/12 |
| | | | 320/108 |
| 2016/0304217 A1* | 10/2016 | Fisher | B64C 39/024 |
| 2017/0031365 A1* | 2/2017 | Sugumaran | G05D 1/0219 |
| 2017/0111102 A1* | 4/2017 | Fan | H04W 4/023 |
| 2017/0111228 A1* | 4/2017 | Obaidi | H04W 24/02 |
| 2017/0144562 A1 | 5/2017 | Thomas et al. | |
| 2017/0205827 A1 | 7/2017 | Rezvani | |

\* cited by examiner

SELF-CHARGING UNMANNED VEHICLE

CROSS-REFERENCE TO RELATED APPLICATIONS

This application is a continuation of U.S. patent application Ser. No. 16/390,747, filed Apr. 22, 2019, which is a continuation of U.S. patent application Ser. No. 15/425,456, filed Feb. 6, 2017, which issued on May 28, 2019 as U.S. Pat. No. 10,301,022, which claims the benefit of U.S. Provisional Patent Application No. 62/293,400, filed on Feb. 10, 2016, entitled "Self-Charging Unmanned Vehicle," the contents of which are hereby incorporated by reference.

BACKGROUND

Unmanned vehicles (e.g., unmanned aerial vehicles) are known for their use in combat zones. In combat zones, they are often used to surveille an area, damage a structures, or lethally wound a potential enemy combatant. The use of unmanned vehicles can go far beyond the aforementioned examples, especially outside of a combat zone and in a commercial setting. Businesses of all sorts are now developing innovative ways to use unmanned vehicles to benefit their business. A current issue with unmanned vehicles is the constant depletion of the power source, which often requires an individual to manually charge it. The flight time for an unmanned aerial vehicle is remarkably short and there is currently no solution to recharge unmanned aerial vehicle power systems without manually removing the battery bank.

SUMMARY

Unmanned vehicles can be terrestrial, aerial, nautical, or multi-mode. UVs will become increasingly commonplace for doing tasks in the future. A number of such tasks may be better accomplished if the unmanned vehicle has the ability to autonomously charge or replace its power source. Discussed in more detail herein are a rechargeable battery system and battery bank, along with creation of an efficient flight (or other movement) plan.

In an example, a method for charging or replacing a power source for an unmanned vehicle may include determining a flight plan of a mission for an unmanned aerial vehicle based on an energy consumption related condition; and deploying the unmanned aerial vehicle based on the flight plan.

In another example, a power source replacement or recharge system may include an autonomous self-propelled power supply device communicatively connected with an unmanned vehicle for charging or replacing a power source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Unmanned vehicles can be terrestrial, aerial, nautical, or multi-mode. Unmanned vehicle will become increasingly commonplace for doing tasks in the future. A number of such tasks may be better accomplished if the unmanned vehicle has the ability to more efficiently use its power source (e.g., battery). An unmanned vehicle may efficiently use its power source based on the unmanned vehicle, server, or other device considering certain conditions, such as smoke (e.g., carbon monoxide, hydrogen cyanide, and other combustion products), temperature, date, time, weather, capacity of power source, or number of unmanned vehicles associated with the mission, as discussed herein. For example, there may be an integration of a rechargeable battery system and battery bank, along with software that recognizes the amount of charge versus power use so an unmanned vehicle can detail how far it can go without running out of power before it is able to return. In an example, a security services drone is activated by a stimuli and flies around a perimeter, then automatically returns to charge itself either because it has finished its perimeter sweep or because it has recognized that it cannot make the un-swept distance without a recharge.

Figure 1:
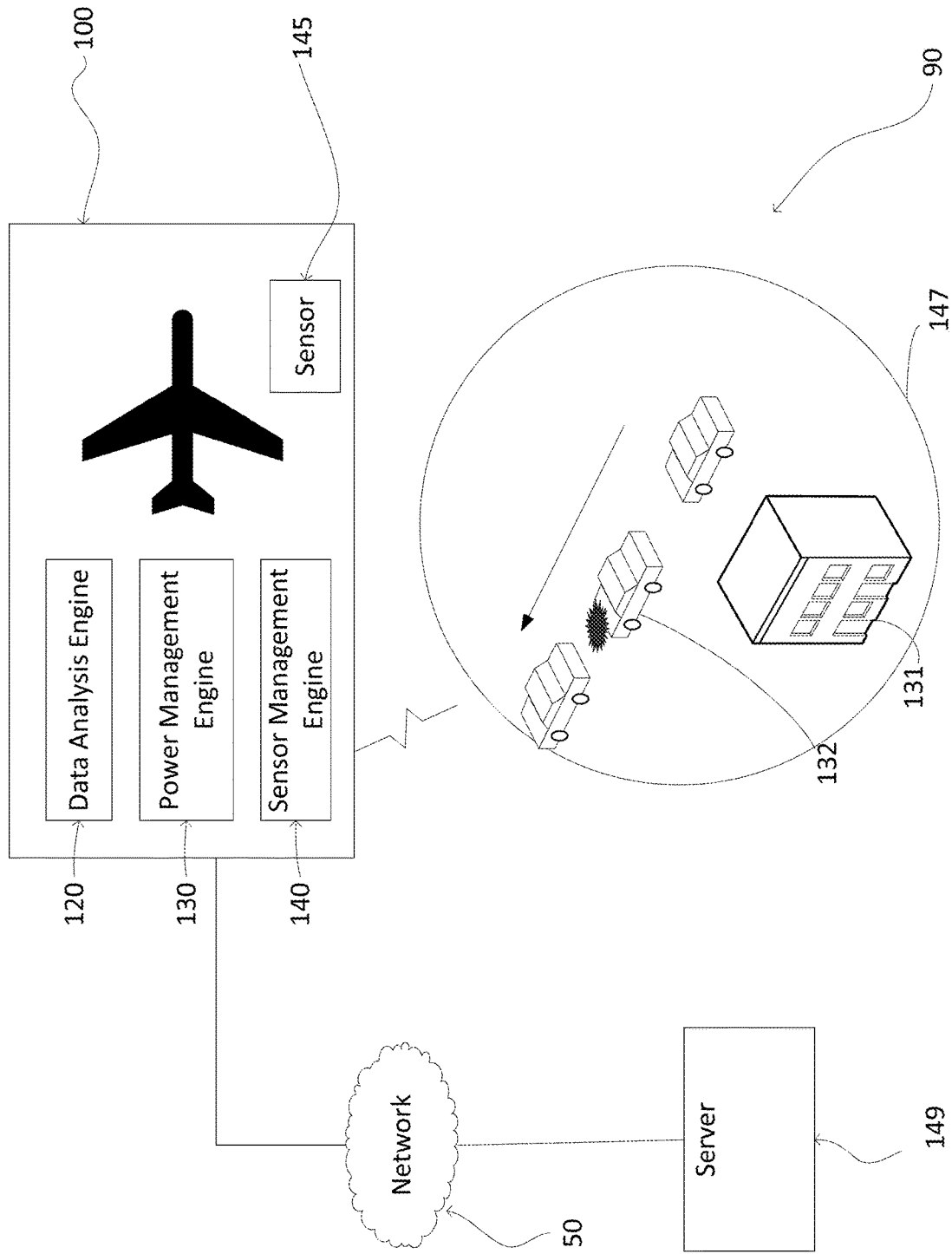
FIG. 1 illustrates an exemplary system associated with self-charging of an unmanned vehicle.

FIG. 1 illustrates an exemplary system 90 associated with self-charging of an unmanned vehicle. Unmanned vehicle 100 includes sensor 145, data analysis engine 120, power management engine 130, and sensor management engine 140. Unmanned vehicle 100 may be communicatively connected with network 50 and server 149. A business (e.g., an insurance provider) may own or have control of unmanned vehicle 100, network 50, or server 149. Structure 131 (e.g., office building, warehouse, or home) and vehicle 132 (e.g., an automobile, motorcycle, or boat) are located in area 147.

Figure 4:
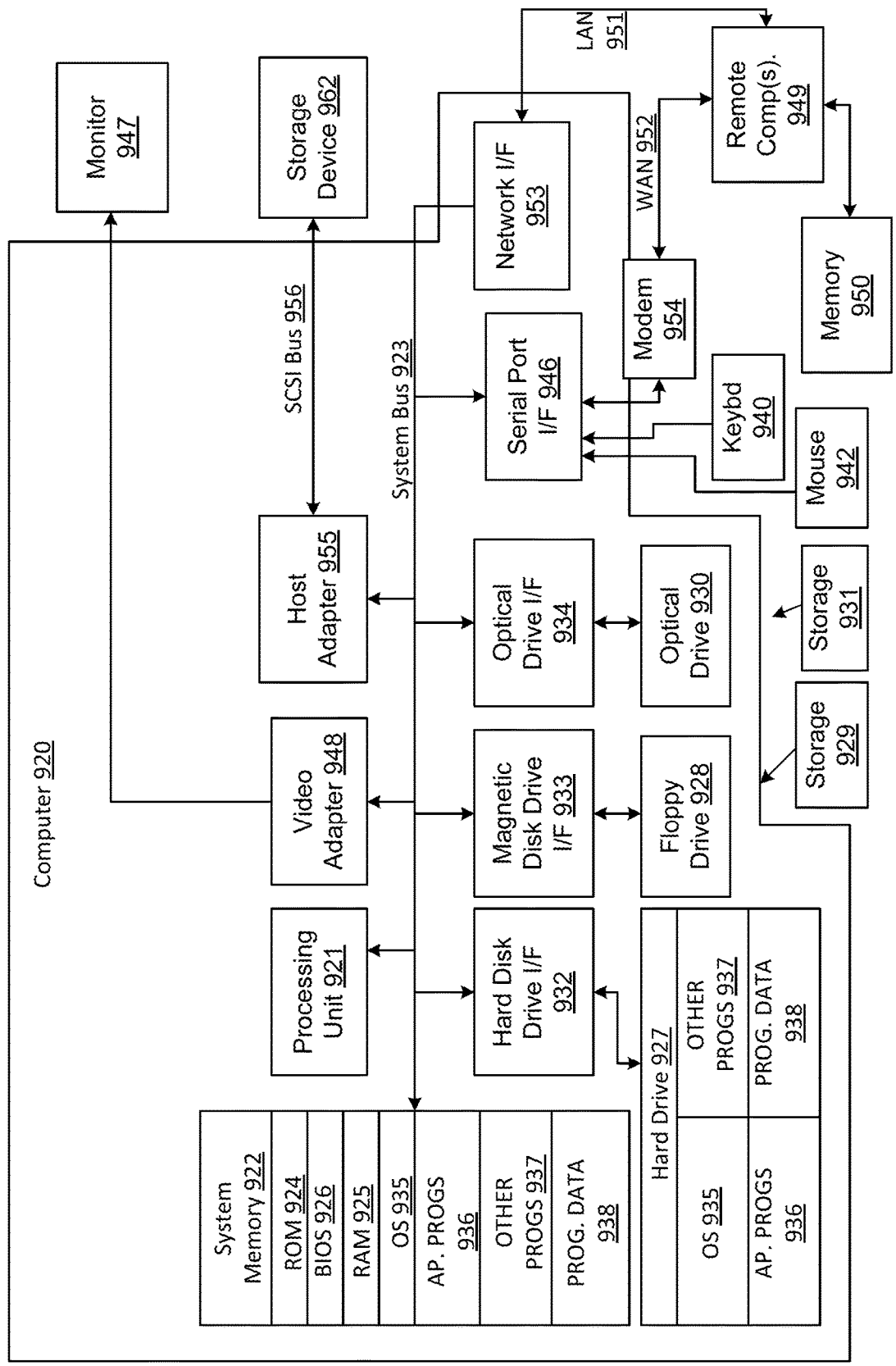
FIG. 4 is an exemplary block diagram representing a computer system in which aspects of the methods and systems disclosed herein or portions thereof may be incorporated.

With continued reference to FIG. 1, data analysis engine 120, power management engine 130, and sensor management engine 140 are logical entities that may be implemented in the form of software (e.g., computer-executable instructions) stored in a memory of, and executing on a processor of unmanned vehicle 100, server 149, or another computer system such as illustrated in FIG. 4. Data analysis engine 120 may analyze data retrieved by sensor 145. Analysis by data analysis engine 120 may include comparing image data to identify types of vehicles/structures, severity of damage, visibility, weather, or the like. Power management engine 130 may be utilized to determine how to complete a mission by unmanned vehicle 100, which may include a predetermined flight path and power source needed to complete the mission in area 147. Power management engine 130 may also determine real-time modifications to the flight path of unmanned vehicle 100 based on gathered data. For example, unmanned vehicle 100 may be directed to an area where the environmental conditions are likely to have less turbulence and therefore require less energy output. Turbulence may be based on wind speed, wind direction (particularly in the relation to the trajectory of unmanned vehicle 100). Trajectory of unmanned vehicle 100 may be significant because wind may help reduce the power output if unmanned vehicle 100 is being carried in the desired direction or wind may increase the power output if unmanned vehicle 100 experiences headwinds (e.g., winds that opposite the desired direction). Wind may be considered responsive to particular locations. For example, some areas between buildings may increase or decrease the general wind speed and therefore power management engine 130 may consider that when determining the flight path of unmanned vehicle 100.

Sensor management engine 140 controls sensor 145. This control may include determining which sensor of a plurality of sensors are gathering data/information, the operating characteristics of said data gathering (e.g., the level of zoom of a visible light camera), where sensor 145 is aimed, or any other sensor performance control variables. It is contemplated herein that sensor 145 may include a visible light camera, an infrared camera, a microphone, a particle inspection device (e.g., a device that can detect what compounds are in sampled air gathered by unmanned vehicle 100), radar emitting/detecting device(s), a spectrometer, a hyperspectral sensor, a temperature sensor, a humidity sensor, an anemometer, a gas sensor, or a navigation sensor, among other things.

Discussed herein is the ability of unmanned vehicle 100 to receive and implement a flight plan (e.g., flight checklist) based on anticipated and detected conditions that may affect power consumption of unmanned vehicle 100. With reference to FIG. 1, for example, when unmanned vehicle 100 is surveying structure 131, there may be conditions in or outside of structure 131 that may cause excessive drain on a power source if a conventional route (e.g., shortest path in time or distance to destination) is taken. It is contemplated herein that a first unmanned vehicle 100 may sense conditions and relay conditions or flight plan instructions to a second unmanned vehicle 100.

Figure 2:
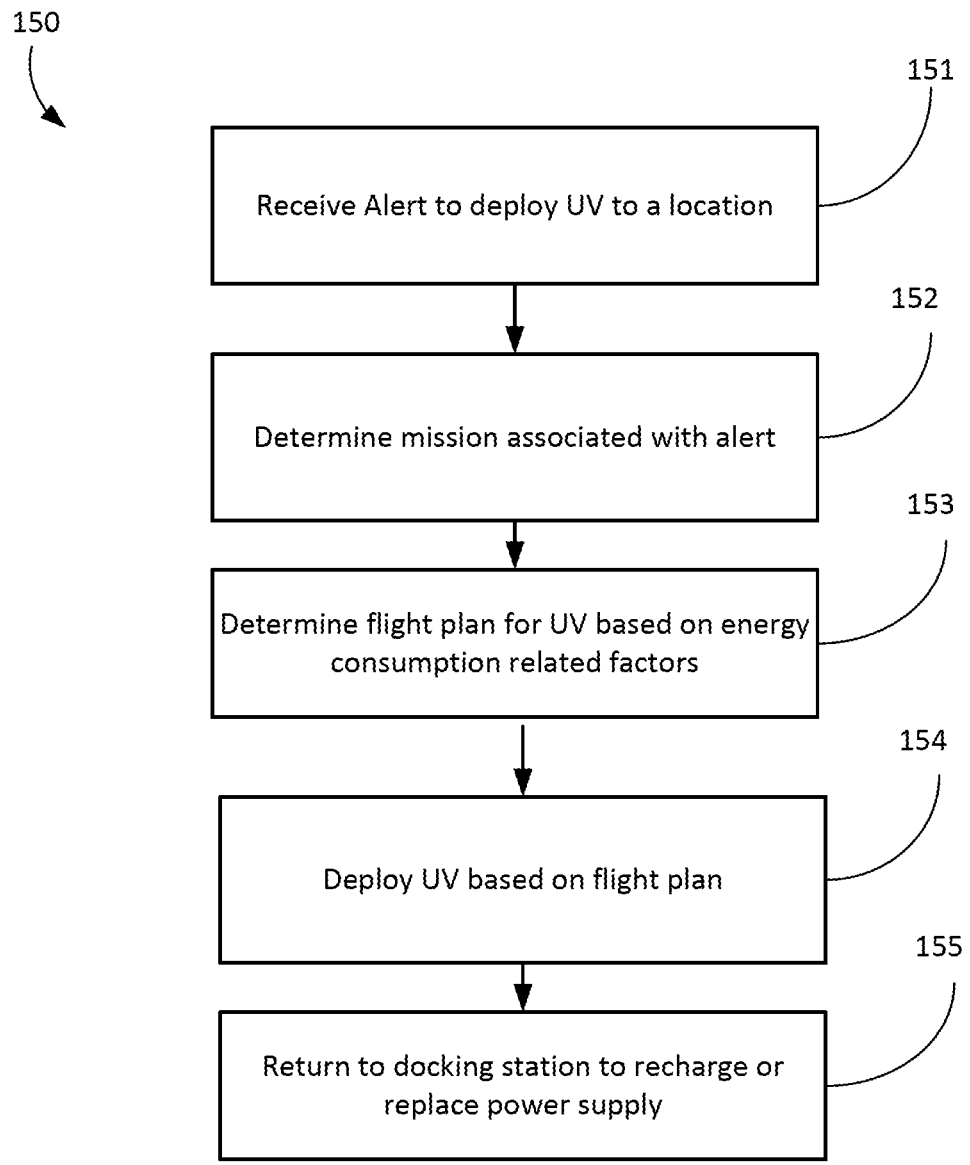
FIG. 2 illustrates an exemplary method to efficiently use or recharge an unmanned vehicle.

FIG. 2 illustrates an exemplary method 150 for efficient power usage or charging of an unmanned vehicle. At step 151, a device, such as server 149 or unmanned vehicle 100, may receive an alert about a location (e.g., area 147). The alert may be based on damage to a structure (e.g., structure 131 or vehicle 132). Structure 131 may be a commercial building, smart home, or the like. At step 151, a mission may be determined based on the alert. A mission may include one or more tasks that are desired to be accomplished for a particular flight of one or more unmanned vehicles. For example, in the context of a building inspection, the mission may generally be to gather damage data associated with structure 131. The tasks may include providing images of three of the 10 sectors (e.g., rooms) of structure 131 and use sensors to detect temperature and moisture in 2 of the 10 sectors.

With continued reference to FIG. 2, at step 153, a flight plan may be determined based on power consumption (also referred to energy consumption) or ability to recharge, among other things, to complete the mission. The flight plan may be determined before the flight as well as while the flight plan is being executed by one or more unmanned vehicles 100. Unmanned vehicle 100 (or other devices, such as server 149) may determine a preferred flight plan based on a consideration of flight path, energy capacity of battery (e.g., amp-hrs), use of alternative energy (e.g., solar), number of trips to recharge or swap power source, number of unmanned vehicles 100 available to help complete the mission, specification of unmanned vehicle 100, weather (e.g., sun, rain, wind, temperature), time available to complete mission, in-flight recharging, power consumption to arrive at destination (e.g., area 147) and return for recharging, indoor airflow (e.g., air conditioner), or the like. In an example, based on temperature unmanned vehicle 100 may find it advantageous to turn-on or off particular systems that drain power because of the temperature.

In an example, unmanned vehicle 100 may have solar panels to assist in powering it. A particular flight path for completing the mission may be chosen because of the desire to have a light source (e.g., sun or other indoor or outdoor light source) to assist in powering unmanned vehicle 100. There may be an estimate of the amount of sun along a proposed flight path and real-time determination of the amount of sun. A flight path of unmanned vehicle 100 (including priority order "checklist" for accomplishing mission goals) may be mapped based on the time of day and where the sun would be to help recharge the battery. If inside structure 131, unmanned vehicle 100 may fly near windows or fly close to internal lights to recharge. In an example, unmanned vehicle 100 may be called to survey an accident. Unmanned vehicle 100 may remain relatively stationary at a relatively far distance to capture sunlight, while accomplishing a mission of taking pictures (or using other sensors 145). This may be accomplished if the unmanned vehicle has a camera that has the ability to capture images from the distance at the resolution that is deemed acceptable for the mission. In another example, the flight plan may be created in a way that energy efficient tasks are prioritized, such as time sensitive tasks done first and less time sensitive, but more energy efficient related tasks done second. In another example, unmanned vehicle 100 may determine a path that allows it to land (e.g., land and recharge) on a structure to complete its task rather than continued flight (in the case of an unmanned aerial vehicle). Unmanned vehicle 100 may land on a corner of a building, window seal, street light, or the like to take pictures or use other sensors. Unmanned vehicle 100 may purposely land at a particular height and use an arm that allows it to push itself off (using minimal energy) and glide to the next destination or use short bursts of its rotors or the like. Unmanned vehicle 100 may position itself on an incline to be able to roll to its next destination and only need to steer. For unmanned vehicles 100 with wheels and brakes, it may take into account the benefit of regenerative braking for a particular path to a destination.

With continued reference to FIG. 2, at step 154, one or more unmanned vehicles 100 are deployed based on the flight plan. Real-time updates of the flight plan may be made based on the real-time changes in conditions. At step 155, unmanned vehicle 100 may return to a docking station (not shown) to recharge or replace the power supply. The docking station may be an inductive charging station in which unmanned vehicle 100 may fly to the appropriate spot on or near the docking station to be charged. Unmanned vehicle 100 may use a combination of sensors (e.g., GPS, beacons, or object recognition system) to locate the docking station. The docking station may be considered an autonomous self-propelled power supply device for charging or replacing a power source. The docking station may be integrated into a first unmanned vehicle 100 for charging in a second unmanned vehicle 100. At step 155, unmanned vehicle 100 may pick-up a new battery and may unload the old battery. This allows unmanned vehicle 100 to relatively quickly obtain a charged power source and resume its mission rather than waiting at a docking station to be charged. Unmanned vehicle 100 may communicate with the docking station regarding a determined capacity of a power source desired. This determination and communication of desired power source can happen during the initial flight plan before deployment or any time during execution of the mission by unmanned vehicle 100, such as just before returning to obtain a power source or in the midst of real-time update of a flight plan because of a change in conditions.

Additional considerations are discussed below. Unmanned vehicle 100 may enter an economy mode, which may be based on things such as the lack of time sensitivity of the mission, reduced access to docking stations, or the like. Economy mode may include unmanned vehicle 100 reducing the speed of the propellers to reduce power consumption. Unmanned vehicle 100 may change the height of flight (e.g., reduce from 20 feet to 10 feet), if it assists with reducing power consumption, while increases the likelihood of completing the mission. In an example, a flight plan may put in a reasonable buffer time of estimate flight based on manual predetermined percentages or percentages based on an analysis of past flights. With regard to scenarios that include multiple unmanned vehicles 100, a flight plan based on power consumption may consider the effect of multiple drones. Understanding how many unmanned vehicles 100 are being used may change a flight plan substantially, such as reducing the number of estimated charges from four to three. Also, if unmanned vehicles 100 through sharing of progress of assigned tasks may help determine in real-time whether in-flight charging is needed or whether a power source of a particular capacity is needed or the like.

Another consideration is that a first unmanned vehicle 100 can share its charging needs with one or more other unmanned vehicles and while a first unmanned vehicle 100 is charging the one or more other unmanned vehicles may modify their flight plan to complete the tasks of first unmanned vehicle 100. Then, once first unmanned vehicle 100 is charged, it (as well as the other unmanned vehicle) may update the flight plan to make it as efficient as possible, such as remaining at the base station (e.g., more efficient to let others finish) or re-joining the group in the mission (e.g., finishing up what was not already done by other unmanned vehicles). Determining whether to rejoin the group may also be based on planned (e.g., already determined/scheduled) or probable (e.g., based on a consideration of previous situations/experience) subsequent missions. As disclosed herein, a flight plan (or more generally unmanned vehicle operating plan) may include a flight path, rotor speed, or level of engagement of vehicle transmission, among other things.

Figure 3:
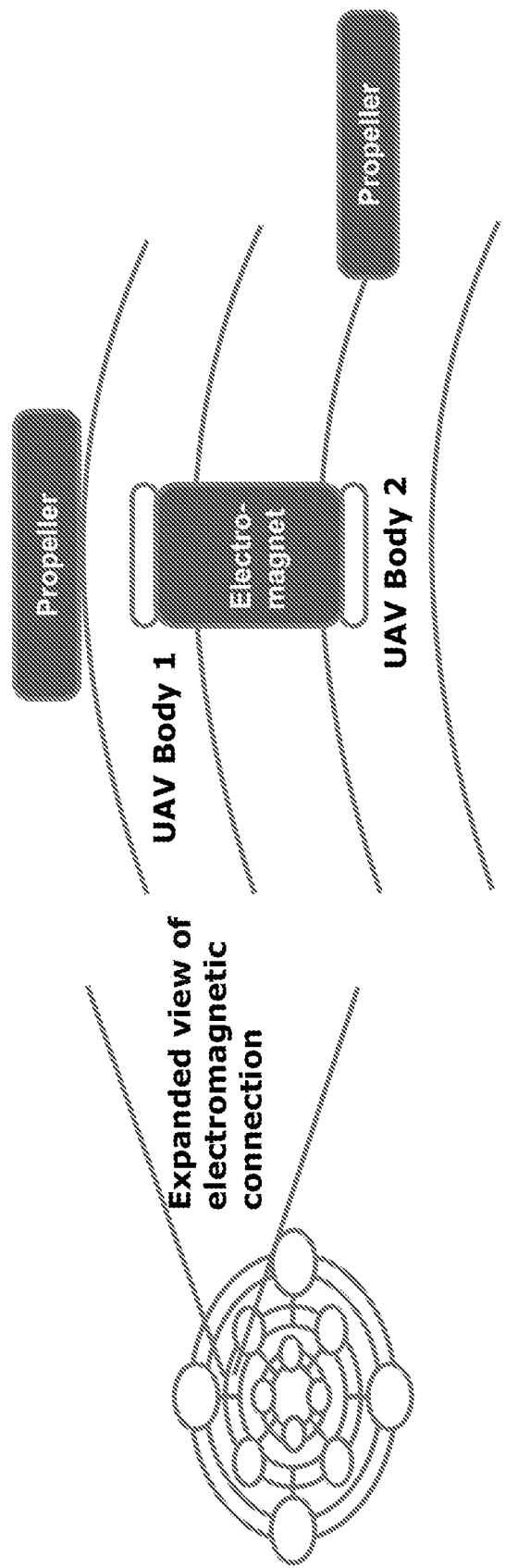
FIG. 3 illustrates an exemplary nestable circular unmanned aerial vehicle with electromagnetic connections.

Another consideration is in-flight or fly/non-stationary docking station charging. There may be an unmanned vehicle 100 that has a primary purpose to charge other unmanned vehicles. This docking station unmanned vehicle 100 may determine a particular spot in the midst of the mission to ground itself in order to minimize power consumption and determine when it is needed to become airborne for in-flight recharging or provide a beacon for another unmanned vehicle to be charged. In another example, there may be a plurality of unmanned vehicles 100 completing tasks in proximity. It may be determined that a first unmanned vehicle 100 may have more power than a second unmanned vehicle. The first unmanned vehicle 100 may have some of the power drained for the mission to be completed. Alternatively, the second unmanned vehicle may just attach to the first unmanned vehicle 100 and transfer remaining power to the first unmanned vehicle 100 for it to complete the tasks of the second unmanned vehicle. Example attachments or configurations may be nested as shown in FIG. 3. There may be many unmanned vehicles 100 that are in air and an assessment of which one(s) to drain/charge in order to get the mission done (e.g., daisy chain). FIG. 3 illustrates an exemplary nestable circular unmanned aerial vehicle with electromagnetic connections. The nestable circular unmanned vehicle uses electromagnetic connections to attach/detach smaller/larger unmanned vehicles within its concentric circular structure. This allows multiple unmanned vehicles 100 to work together either connected or disconnected to accomplish a set of instructions. Each unmanned vehicle 100 may communicate with each other to maximize efficiency while accomplishing the task. Each unmanned vehicle 100 may communicate with the other to determine the order to nest or detach.

Herein are several different examples associated with self-charging unmanned vehicles. It is contemplated herein that methods, components, or the like of each example may be reasonably integrated with or removed from other examples discussed herein. Additional examples are discussed below.

In an example, data gathered by unmanned vehicle 100 may be compared or utilized in coordination with data gathered from other sources. For example, data may be utilized that is gathered from a "smart building" (a building, residential, commercial or industrial), such as via one or more sensors deployed on or near the smart building.

In another example, unmanned vehicle 100 may be equipped with a surplus of sensors 145, of which only some may be utilized on a given mission. In another example, unmanned vehicle 100 is dynamically equipped with sensors 145 and other equipment (e.g., number of batteries or energy capacity of batteries) based on the parameters of the mission. In another embodiment or use case, the types of sensors 145 selected are determined at least partially based on the type of event that has occurred (e.g., if the event is a flood from a river, then sensors 145 that gather hyperspectral imagery may not be included on unmanned vehicle 100).

In another example, data is streamed via LTE, Wi-Fi, or any networking means as would be recognized by those skilled in the art. In another example, data is streamed via one or more unmanned vehicles 100 communicating or relaying information to a communication station for one another.

In another example, a plurality of unmanned vehicles 100 are assigned to a plurality of airspaces that may be assigned, and said airspaces may be exclusive of each other (or they may not be exclusive of each other). It is contemplated herein that airspaces may be exclusive of each other via geographical coordinates (e.g., the x-axis or the y-axis) or via altitude (e.g., the z-axis).

In another example, the engines related to specific flight and safety control of unmanned vehicle 100 may be separate from the engines that analyze the data (e.g., data analysis engine 120, power management engine 130, and sensor management engine 140).

In another example, a mission or plurality of missions may be analyzed to determine what sensor(s) 145 or other equipment (e.g., batteries) should be installed on unmanned vehicle 100 for future missions.

The present disclosure is directed to self-charging of unmanned vehicles. The present disclosure is not limited in any way to the examples, which can be applicable in various forms, as appreciated by one skilled in the art. Therefore, it is to be understood that any terms, phrases, structural and functional details, disclosed herein are merely a basis for the claims and as a representative for teaching one skilled in the art to variously employ the present disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

One skilled in the art will appreciate further features and advantages based on the described examples. Accordingly, the disclosure is not to be limited by what has been particularly shown and described, except as indicated by the appended claims. Further, although at least one series of steps are presented as an exemplary method of practicing one or more examples described herein, it will be appreciated by those skilled in the art that the steps identified may be practiced in any order that is practicable, including without limitation the omission of one or more steps.

It is to be appreciated that network 50 depicted in FIG. 1, for example, may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, system 90 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 90, or portions thereof, may be stored in a remote memory storage device such as storage medium. Computing devices may communicate over network 50 through one or more communications links 75 formed between data interfaces. Communication links 75 may comprise either wired or wireless links. It is to be appreciated that the illustrated network connections in the figures (e.g., FIG. 1 or FIG. 4) are exemplary and other ways of establishing a communications link between multiple devices may be used.

FIG. 4 and the following discussion are intended to provide a brief general description of a suitable computing environment in which the methods and systems disclosed herein, or portions thereof may be implemented, such as in unmanned vehicle 100. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, mini-computers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 4 is a block diagram representing a general purpose computer system in which aspects of the methods and systems disclosed herein and/or portions thereof may be incorporated. As shown, the exemplary general purpose computing system includes a computer 920 or the like, including a processing unit 921, a system memory 922, and a system bus 923 that couples various system components including the system memory to the processing unit 921. The system bus 923 may be any of several types of bus structures including a memory bus or memory controller, a peripheral bus, and a local bus using any of a variety of bus architectures. The system memory includes read-only memory (ROM) 924 and random access memory (RAM) 925. A basic input/output system 926 (BIOS), containing the basic routines that help to transfer information between elements within the computer 920, such as during start-up, is stored in ROM 924.

The computer 920 may further include a hard disk drive 927 for reading from and writing to a hard disk (not shown), a magnetic disk drive 928 for reading from or writing to a removable magnetic disk 929, and an optical disk drive 930 for reading from or writing to a removable optical disk 931 such as a CD-ROM or other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide non-volatile storage of computer readable instructions, data structures, program modules and other data for the computer 920. As described herein, computer-readable media is a tangible, physical, and concrete article of manufacture and thus not a signal per se.

Although the exemplary environment described herein employs a hard disk, a removable magnetic disk 929, and a removable optical disk 931, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 929, optical disk 931, ROM 924 or RAM 925, including an operating system 935, one or more application programs 936, other program modules 937 and program data 938. A user may enter commands and information into the computer 920 through input devices such as a keyboard 940 and pointing device 942. Other input devices (not shown) may include a microphone, joystick, game pad, satellite disk, scanner, or the like. These and other input devices are often connected to the processing unit 921 through a serial port interface 946 that is coupled to the system bus, but may be connected by other interfaces, such as a parallel port, game port, or universal serial bus (USB). A monitor 947 or other type of display device is also connected to the system bus 923 via an interface, such as a video adapter 948. In addition to the monitor 947, a computer may include other peripheral output devices (not shown), such as speakers and printers. The exemplary system of FIG. 4 also includes a host adapter 955, a Small Computer System Interface (SCSI) bus 956, and an external storage device 962 connected to the SCSI bus 956.

The computer 920 may operate in a networked environment using logical connections to one or more remote computers, such as a remote computer 949. The remote computer 949 may be a personal computer, a server, a router, a network PC, a peer device or other common network node, and may include many or all of the elements described above relative to the computer 920, although only a memory storage device 950 has been illustrated in FIG. 4. The logical connections depicted in FIG. 4 include a local area network (LAN) 951 and a wide area network (WAN) 952. Such networking environments are commonplace in offices, enterprise-wide computer networks, intranets, and the Internet.

When used in a LAN networking environment, the computer 920 is connected to the LAN 951 through a network interface or adapter 953. When used in a WAN networking environment, the computer 920 may include a modem 954 or other means for establishing communications over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing a communications link between the computers may be used.

Computer 920 may include a variety of computer readable storage media. Computer readable storage media can be any available media that can be accessed by computer 920 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 920. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for more power efficient unmanned vehicle 100 which may include may include determining a flight plan of a mission for unmanned vehicle 100 based on an energy consumption related condition; and deploying unmanned vehicle 100 based on the flight plan. The condition may include moisture, smoke, temperature, date, time, weather, capacity of power source, or number of unmanned vehicles 100 associated with the mission. A system may include an autonomous self-propelled power supply device; and unmanned vehicle 100 connected with the autonomous self-propelled power supply device for charging or replacing a power source. The autonomous self-propelled power supply device may broadcast a beacon to unmanned vehicle 100. The charging may be inductive charging or another alternative charging. There may be a flight plan shared during the charging or replacing of the power source of unmanned vehicle 100. Unmanned vehicle 100 may include a processor and a memory coupled with the processor. The memory store executable instructions that when executed by the processor cause the processor to effectuate operations that include receiving a flight plan for a mission based on an energy consumption related condition; and operating unmanned vehicle 100 based on the flight plan. All combinations in this paragraph (including the removal or addition of steps or components) are contemplated in a manner that is consistent with the other portions of the detailed description.

The invention claimed is:

1. A method comprising:
   receiving an alert to deploy a first unmanned vehicle according to a mission, wherein the mission includes completion of at least one task according to a first path;
   operating the first unmanned vehicle in a first mode, in which it operates in a mobile manner and functions as an autonomous self-propelled power supply device, wherein the first mode is configured to execute the mission;
   determining, by the first unmanned vehicle, a power level of the first unmanned vehicle as it operates in the first mode;
   determining, by the first unmanned vehicle and based on the power level, to switch to a second mode, wherein the first unmanned vehicle moves to a location and renders itself stationary such that it uses less power in the second mode than in the first mode;
   operating in the second mode;
   attaching, with electromagnetic connections, the first unmanned vehicle to a second unmanned vehicle;
   transferring power from the first unmanned vehicle to the second unmanned vehicle; and
   modifying a flight plan of the second unmanned vehicle to complete the mission.

2. The method of claim 1, wherein, in the first mode, the first unmanned vehicle is configured to travel along the first path; and
   wherein, in the second mode, the first unmanned vehicle is configured to travel along a second path.

3. The method of claim 1, wherein the determining to switch to the second mode is further based on a current power usage of the first unmanned vehicle.

4. The method of claim 1, wherein the method further comprises receiving data from a sensor of the first unmanned vehicle; and
 wherein the determining to switch to the second mode is further based on the data from the sensor.

5. The method of claim 1, wherein the first mode is associated with a first power source and the second mode is associated with a second power source.

6. The method of claim 1, wherein the determining to switch to the second mode is further based on an environmental condition.

7. The method of claim 1, wherein the first mode comprises a first speed mode and the second mode comprises a second speed mode.

8. The method of claim 1, wherein the first unmanned vehicle is traveling to a destination; and
 wherein the determining to switch to the second mode is further based on the second unmanned vehicle traveling to the destination.

9. A method comprising:
 receiving an alert to deploy a first unmanned vehicle according to a mission, wherein the mission includes completion of at least one task according to a first path;
 determining, by a first unmanned vehicle, which operates as an autonomous self-propelled power supply device, power needed for the first unmanned vehicle to travel the first path to a destination;
 determining, by the first unmanned vehicle and based on the power needed and a power level of the first unmanned vehicle, to switch to a second mode from a first mode, wherein the first mode is configured to execute the mission, and, wherein the first unmanned vehicle moves to a power supply replacement location and renders itself stationary such that it uses less power in the second mode than in the first mode;
 traveling along a second path to the destination and stopping at the power supply replacement location;
 causing the first unmanned vehicle to transfer power to a second unmanned vehicle by attaching, with electromagnetic connections, to the second unmanned vehicle; and
 modifying a flight plan of the second unmanned vehicle to complete the mission.

10. The method of claim 9, further comprising determining environmental data associated with the first path; and
 wherein the determining the power needed for the first unmanned vehicle to travel the first path is further based on the environmental data.

11. The method of claim 9, wherein the method further comprises receiving data from a sensor of the first unmanned vehicle; and
 wherein the determining the power needed for the first unmanned vehicle to travel the first path to the destination is further based on the data from the sensor.

12. The method of claim 9, wherein the first path is associated with a first landing location at the destination and a second path is associated with a second landing location at the destination.

13. A method comprising:
 receiving an alert to deploy a first unmanned vehicle according to a mission, wherein the mission includes completion of at least one task according to a first path;
 determining a power level of a first unmanned vehicle operating in a first power mode, operating in a mobile manner and functioning as an autonomous self-propelled power supply device;
 determining, based on the power level of the first unmanned vehicle and a destination of the first unmanned vehicle, to switch to a second power mode from a first mode, wherein the first mode is configured to execute the mission, and wherein the first unmanned vehicle moves to a location and renders itself stationary such that it uses less power in the second power mode than in the first power mode;
 causing the first unmanned vehicle to enable a second unmanned vehicle to attach, with electromagnetic connections, to the first unmanned vehicle;
 transferring power from the first unmanned vehicle to the second unmanned vehicle; and
 modifying a flight plan of the second unmanned vehicle to complete the mission.

14. The method of claim 13, wherein the second power mode comprises a rotor speed mode.

15. The method of claim 13, wherein the second power mode is associated with a flying altitude of the first unmanned vehicle.

16. The method of claim 13, wherein the first power mode is associated with travel along the first path and the second power mode is associated with travel along a second path.

17. The method of claim 13, wherein the first power mode is associated with a first power source and the second power mode is associated with a second power source.

18. The method of claim 13, further comprising determining a level of engagement of the first unmanned vehicle.

19. The method of claim 13, wherein the first unmanned vehicle is traveling to a destination; and
 wherein the determining to switch to the second power mode is further based on the second unmanned vehicle traveling to the destination.

* * * * *